May 12, 1959  L. C. RATLIFF  2,886,056
VALVE ASSEMBLY
Filed Nov. 2, 1956
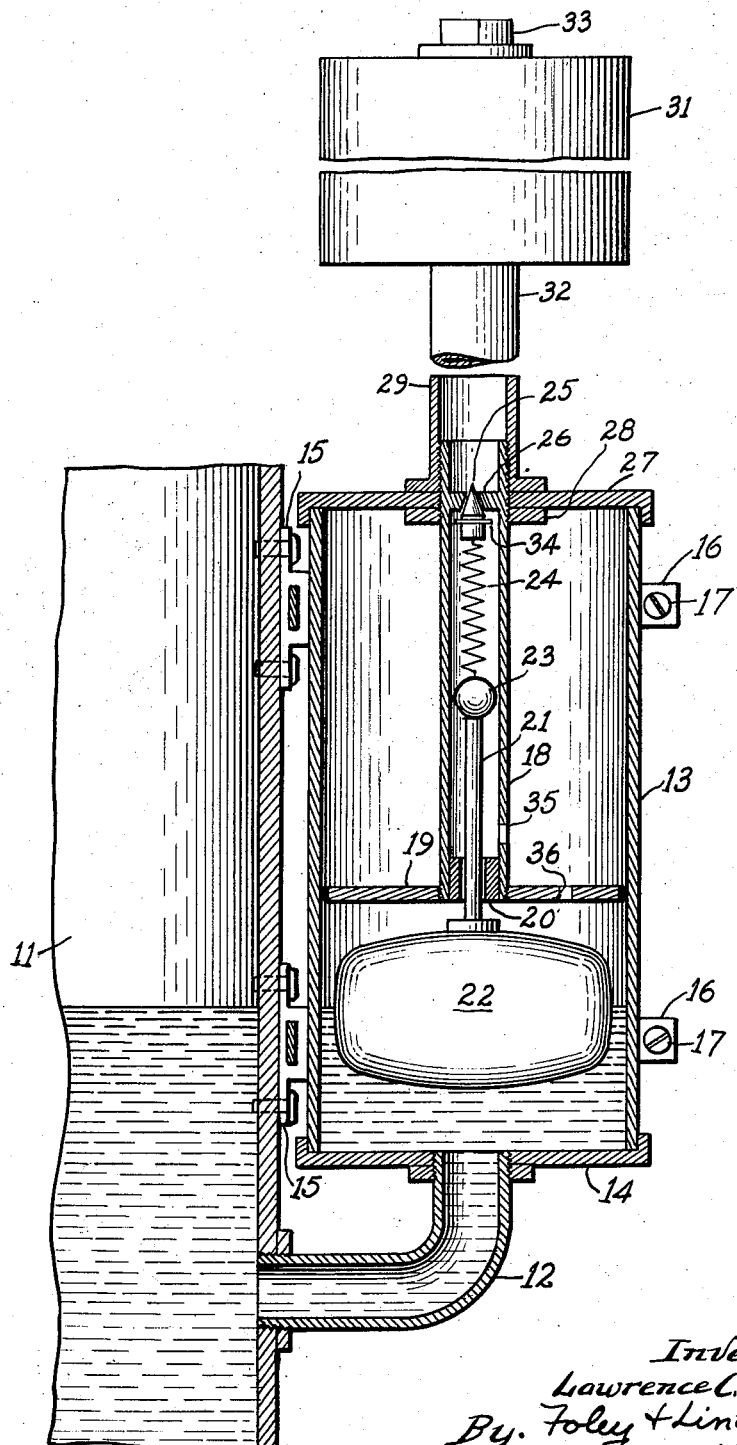
Inventor.
Lawrence C. Ratliff.
By. Foley + Lindberg
Attorneys.

United States Patent Office 2,886,056
Patented May 12, 1959

2,886,056

VALVE ASSEMBLY

Lawrence C. Ratliff, Chicago, Ill.

Application November 2, 1956, Serial No. 620,015

2 Claims. (Cl. 137—430)

This invention relates to a float controlled valve assembly especially adapted to supply lubricating oil as and when needed from a supply tank to a reservoir associated with the mechanism requiring the lubricating oil, and all of which is subjected to constant, prolonged or frequent vibration. An example of a mechanism subject to such vibration would be an automatic transmission for automotive vehicles. The invention is not limited, however, to use with such transmissions, as there are other mechanisms requiring lubrication which are subject to very considerable vibration and with which this invention could well be used for providing an assured supply of lubricating oil.

To illustrate the usefulness of the invention its application to automatic transmissions will now be described, but for illustrative rather than limiting purposes.

In the use of such automatic transmissions, oil under pressure is employed either for creating torque for driving the vehicle or for shifting the variable speed gears in a transmission. A supply of oil greater than the maximum amount that is actually in use at any instant must necessarily be maintained in the transmission case available for use. During ordinary operations the amount of oil lying in the storage reservoir increases and decreases conversely as the amount of oil in use in the transmission system under pressure varies. When the motor of the vehicle is stopped it is conventional practice to allow oil to drain back into the storage space in the transmission case. As a consequence, both during normal usage and during idle periods the depth of oil found at any time in the reservoir of the transmission case varies considerably.

Also, during normal operations over a period of time there frequently will be some loss of oil from the transmission case, and this loss may cause serious mechanical damage to the transmission mechanism should the amount of oil remaining be insufficient for the normal requirements of the transmission.

An excess of oil in the transmission case may be lost by leakage or may cause other undesired effects. Because of the normal variations in the oil level in the transmission case and because of the manner in which oil drains from the fluid couplings to the storage reservoir, together with other factors peculiar to these transmissions, the maintenance of an adequate supply of oil in the case has not been a simple and convenient matter, and this problem has been further complicated by the existence of severe vibration.

The general object of the present invention is to provide for the automatic maintenance of an adequate oil supply in an oil reservoir associated with a point of use, by regulating the supply of oil from an oil supply tank in the amount and on the occasions when it is needed.

Another object of the invention is to provide an oil supply valve assembly designed to operate accurately and reliably even though subject to constant or frequent vibration.

Another object of the invention is to provide a valve assembly for the accomplishment of the foregoing objects, and which will be economical to manufacture and install.

Other objects and advantages of the invention will be mentioned hereinafter or will become apparent from this specification.

Referring now to the drawing, the single figure, not necessarily drawn to a uniform scale, shows, largely in cross section, a portion of a reservoir 11 in which it is desired to maintain a supply of oil. For example, this may be the automatic transmission case of an automotive vehicle, or it may be some other reservoir in which the oil is to be maintained in direct communication with an area of use.

The reservoir 11 is connected by a conduit 12 to a valve casing 13 in any appropriate manner through the bottom closure 14. The valve casing may be removably secured to the reservoir 11 by means of brackets such as 15 together with conventional pipe straps 16 engaged with the brackets and wrapped around the casing 13, with their outer ends secured in a conventional manner by screws or bolts such as 17. Centrally disposed in the casing 13 is a cage 18 whose lower end may be stabilized in a desired position by a plate or spacing spider 19 secured thereto in any appropriate manner. Fixed in the lower end of the cage 18 is a guide sleeve 20 for reciprocably guiding a float stem 21 rigidly attached to a hollow float 22.

Supported loosely on the top of this stem is a ball shaped spring supporting pilot 23 and upon the ball a coil spring 24 which supports on its upper end a small needle valve 25 which is adapted to be seated in a valve seat 26. The cage 18 may be threaded as shown where it passes through the top closure 27 of the casing and lock washer 28 may be employed as shown, together with the flanged pipe 29 to rigidly lock the upper end of the cage in the valve casing 13.

An oil supply tank 31 of any desired size may be mounted at an elevated position higher than the casing 13 and may be connected to the pipe 29 by a flexible tube 32 in a conventional manner. A plug such as 33 of conventional form may be provided on the supply tank to close a filling opening. The supply tank itself may be transparent, if desired, to reveal the quantity of oil therein, or a conventional sight glass may be provided if the supply tank walls are opaque.

When the invention is used with an automatic transmission of the character now in common use the oil level in the reservoir 11 will usually fall when the transmission is in use as the oil is then pumped into the operating parts. In such case, the length of the spring 24 will be so pre-determined that even though the float 22 drops a corresponding amount with the oil in the reservoir the spring 24 will nevertheless keep the needle valve 25 seated. But when the level in the reservoir drops more than the normal amount, that is, when the oil supply needs to be replenished, the spring 24 supported by the float will allow the valve 27 to become unseated and will allow oil to enter the valve casing 13 from the supply tank 31 to the extent needed.

The upper closure plate 27 and the lower plate 14 of the casing may be secured thereto in any suitable manner.

The spring 24 will be of such predetermined length and strength that it will cooperate with the float to hold the valve seated until the liquid level supporting the float drops below a predetermined level, that is, when the oil supply in the reservoir needs to be replenished. During variations of the liquid level the spring will be somewhat compressed by the float, but always holding the valve seated. Vibration to which the float is subjected will not be transmitted in full to the valve, but will be dampened by the spring 24. Hence, though the valve may be subjected to vibration, it will be held closed through the cooperation of the float and spring as long as the liquid level remains above the predetermined desired minimum level. Undesired seating of the valve by reason of vibration will thus be avoided and undue wear of the valve and valve seat thus eliminated.

When assembling the device the sleeve 20 is not inserted into the lower end of the valve cage until after the ball 23, spring 24 and valve have been inserted upwardly into the cage. Thereafter, the sleeve holds these three parts against accidental escape and when the device is operating guides the valve stem.

The spring 24 is shown in a diagrammatic manner. In actual practice however, it will have an outside diameter slightly less than the inside diameter of the cage 18, its lower end resting in a conventional manner on the ball 23 while its upper end will surround the lower shank portion of the valve below the shoulder 34, thus holding the valve in vertical alignment when unseated.

When the oil level in the valve casing or reservoir reaches such a point that the valve 24 will open, oil will flow from the supply tank 31 and tube 32 past the open valve and escape from the tube 18 through apertures such as 35 and through the plate 19, through apertures such as 36, into the lower end of the casing and thence into the reservoir.

In addition to mounting the valve casing 13 on the outside of the oil reservoir 11 and connecting it thereto by an appropriate pipe 12, I may, in many installations dispose the valve casing 13 directly inside of the reservoir in which an oil level is to be maintained, for example the transmission case, and support it in any appropriate manner at the proper level so that the float 22 will be partially submerged directly in the oil in the reservoir. For example, plate 27 may be attached to the inside top of the transmission case. The entire valve assembly will operate in such instances in the manner herein before described. If desired and if necessary, an air vent, not shown, may be provided in the filling plug 33, as is conventional for many filling plugs.

This application is a continuation-in-part of my co-pending application Serial No. 455,013, filed September 9, 1954 and now forfeited.

While the invention is herein illustrated in considerable detail, it should be understood that it is subject to some modification and variation without departing from the scope of the invention defined in the appended claims.

Having shown and described my invention, I claim.

1. In combination with an oil reservoir case having oil therein and subject to substantial vibration during normal use, a casing and means securing it to said case, a cylindrical valve cage secured in the upper end of said casing and extending downwardly therein, a valve seat in the upper end portion of said cage, a needle valve seating upwardly against said seat, the cage having an oil outlet below the valve seat and valve communicating with the casing, means establishing communication between the lower end of said casing and with said case to maintain the same oil level in both, a float element disposed below the valve cage partially immersed in said oil, a rod secured to said float element extending upwardly into said cage, a guide sleeve insertable into the lower end of said cage maintaining said rod in vertical slidable relationship with said cage, a spring support pilot loosely carried on the upper end of said rod and slidably guided on the cage wall, a spring normally subject to vertical compression interposed between and having its ends abutting said pilot and said valve and slidably guided and retained by said cage, and storage means positioned and connected for supplying oil by gravity to the valve cage above the valve seat.

2. In combination with an oil reservoir case containing oil and subject to substantial vibration during normal use, a casing and means securing it to said reservoir case, a cylindrical valve cage secured in the upper end of said casing and extending downwardly therein, a valve seat in the upper end portion of said cage, a valve seating upwardly against said seat, the cage having an oil outlet below the valve seat and valve communicating with the casing, means establishing communication between the lower end of said casing and with said case to maintain the same oil level in both, a float element disposed below the valve cage partially immersed in said oil, a rod secured to said float element extending upwardly into said cage, a guide sleeve insertable into the lower end of said cage maintaining said rod in vertical slidable relationship with said cage, a ball shaped spring support carried on the upper end of said rod, a spring normally subject to vertical compression interposed between and having its ends abutting said support and said valve and slidably guided and retained by said cage, and storage means positioned and connected for supplying oil by gravity to the valve cage above the valve seat.

References Cited in the file of this patent

UNITED STATES PATENTS

| | | |
|---|---|---|
| 369,863 | Lloyd | Sept. 13, 1887 |
| 628,581 | Grosswyler | July 11, 1899 |
| 1,049,992 | Catchings | Jan. 7, 1913 |
| 1,313,925 | Stewart | Aug. 26, 1919 |
| 1,695,754 | Benn | Dec. 18, 1928 |
| 1,707,662 | Hennessy | Apr. 2, 1929 |
| 2,563,481 | Muller | Aug. 7, 1951 |
| 2,626,017 | Bibko | Jan. 20, 1953 |

FOREIGN PATENTS

| | | |
|---|---|---|
| 556,682 | Germany | Aug. 15, 1932 |